United States Patent [19]
Akers

[11] 3,840,415
[45] Oct. 8, 1974

[54] METHOD OF MANUFACTURING TIRES
[76] Inventor: Robert M. Akers, 1301 E. Reno, Oklahoma City, Okla.
[22] Filed: May 1, 1972
[21] Appl. No.: 249,692

[52] U.S. Cl.................... 156/114, 152/21, 156/96
[51] Int. Cl............................................. B29h 17/38
[58] Field of Search ................ 156/96, 114; 152/21

[56] References Cited
UNITED STATES PATENTS
| | | | |
|---|---|---|---|
| 2,672,910 | 3/1954 | Corson................................ | 156/114 |
| 3,062,255 | 11/1962 | Clark et al........................... | 156/114 |
| 3,666,613 | 5/1972 | Beninga.............................. | 156/114 |

*Primary Examiner*—Clifton B. Cosby
*Attorney, Agent, or Firm*—Dunlap, Laney, Hessin, Dougherty & Codding

[57] ABSTRACT

A method for manufacturing tires and particularly tire treads wherein particles of an abrasive material consisting essentially of aluminum oxide particles of a predetermined size are heated at a predetermined temperature level to remove low temperature impurities, foreign matter and moisture, and the substantially clean, substantially moisture-free abrasive particles are subsequently mixed into an uncured rubber formulation.

10 Claims, No Drawings

METHOD OF MANUFACTURING TIRES

BACKGROUND OF THE INVENTION

1. Field of the Invention

This invention relates generally to improvements in methods for manufacturing tires and, more particularly, but not by way of limitation, to an improved method for manufacturing a tire tread having particles of an abrasive material embedded in the rubber formulation.

2. Description of the Prior Art

As well known in the art, the non-skidding and braking abilities of automobile and truck tires have been problems plaguing the tire manufacturing industry and the public in general for many years. Past efforts for improving the non-skidding and braking abilities of tires have been directed primarily to the configuration of the tire treads, such as in tread design or increasing the amount of rubber in contact with the road surface, or both. Improvements have been made in this manner, but the improved tires still have a tendency to slip on wet paving, for example, to such a degree that driving is hazardous.

In the past, there have been numerous attempts to incorporate various materials into the rubber formulation of the tire tread in an effort to enhance the non-skidding and braking ability of the tire. There have also been attempts, in the past, to incorporate various materials in other compositions and in rubber formulations of tires for various purposes, other than to enhance the non-skidding and braking ability of the tire, such attempts being typified in the following U.S. Pats.; No. 3,062,255, issued to Clark et al.; No. 1,175,624, issued to Fawkes; No. 1,266,100, issued to Brown; No. 2,472,331, issued to Koehler; No. 3,093,601, issued to Gessler; No. 3,165,487, issued to Gardner; No. 3,386,840, issued to Gruber; No. 3,422,053, issued to Henderson; No. 3,462,516, issued to Smith; No. 3,484,405, issued to Seto; No. 3,507,818, issued to Roach; No. 1,330,973, issued to Bartholomew; No. 1,330,988, issued to Sayre; No. 2,552,500, issued to Doenhoff; No. 2,675,047, issued to Andy; No. 2,727,935, issued to Kloepfer; No. 2,752,979, issued to Knill; No. 1,412,744, issued to Hobson et al.; No. 1,688,491, issued to Raoul; No. 1,578,121, issued to Haw; No. 993,222, issued to Busby; No. 1,250,405, issued to Williams; No. 2,467,418, issued to Alexiadis; No. 2,672,910, issued to Corson; No. 2,690,461, issued to Steeves; No. 1,290,576, issued to Kendall; No. 1,978,301, issued to Fisher; No. 2,011,496, issued to Luchinger; No. 3,227,200, issued to Andy; No. 2,961,026, issued to Stanton; No. 1,088,845, issued to Stromeyer; and No. 2,766,800, issued to Rockoff.

SUMMARY OF THE INVENTION

An object of the invention is to provide an improved method of manufacturing tires having particles of an abrasive material embedded therein.

Another object of the invention is to provide an improved method of manufacturing tires wherein the bond between the rubber formulation and the particles of abrasive material is substantially improved.

One other object of the invention is to provide a method of manufacturing a tire having particles of an abrasive material embedded in the rubber formulation in a more efficient, more economical and more secure manner.

A still further object of the invention is to provide a more efficient, more economical and improved method for embedding particles of an abrasive material in a rubber formulation suitable for a tire tread.

An additional object of the invention is to provide an improved method for manufacturing a rubber formulation having particles of an abrasive material embedded therein suitable for recapping tires in a more efficient and more economical manner and in a manner substantially assuring a sufficient bond between abrasive material and the rubber formulation.

Other objects and advantages of the invention will be evident from the following detailed description of the preferred embodiments.

DESCRIPTION OF THE PREFERRED EMBODIMENTS

The materials forming a tire tread in accordance with this invention basically comprise an elastomer or rubber formulation and relatively fine particles of abrasive material embedded in the elastomer.

The elastomer may be any rubber formulation heretofore employed in tire treads, such as the well known types of rubber formulations employed in recapping rubber. Normally, such a rubber formulation includes any of several desired rubber polymers, such as styrenebutadine and polybutadine; a carbon black filler; an aromatic oil; an antioxidant; wax and curing chemicals. A rubber formulation which has been used with desirable results consists of the following with the parts, by weight, of each component being noted:

| Component | Parts |
| --- | --- |
| Styrenebutadine | 116.87 |
| Polybutadine | 15.00 |
| Carbon Black | 70.00 |
| Aromatic | 8.13 |
| Low Temperature Reaction Product of Diphenylamine and Acetine (obtained under the Trademark Aminox) | 2.00 |
| A Micro Crystalline Wax of a Paraphinic Nature | 1.00 |
| Zinc Oxide | 3.00 |
| Stearic Acid | 2.00 |
| Sulphur | 2.25 |
| N-Oxydithylene Benzothiazal -2- Sufenamid | 0.95 |
| Tetramethyl Thiuram Monosulfide | 0.20 |

The particles of abrasive material consist essentially of aluminum oxide abrasive aggregate and, in one form, include an aggregate consisting essentially of magnetite, as will be described in greater detail below. The particles of abrasive material are initially crushed and sized to obtain particles having a predetermined maximum size defined by the mesh size of the abrasive material, the mesh sizes being described in greater detail below.

After the sizing of the particles of abrasive material, the abrasive material is then heated at a predetermined temperature level and for a predetermined period of time sufficient to remove the low temperature impurities, foreign matter (such as dirt, for example), and moisture, thereby providing substantially clean, moisture-free particles of the abrasive material. More particularly, and, in a preferred form, the abrasive material; that is, the aluminum oxide abrasive aggregate, in one preferred form, and the aluminum oxide abrasive aggregate and the magnetite aggregate, in one other form, is heated at a temperature level in the range of approximately 1800 degrees Fahrenheit to approximately 1850° Fahrenheit for approximately 30 minutes.

The heating of the particles of abrasive material essentially burns off the dust particles collected on the particles which, in essence, clog the particle capillaries, thereby increasing the capillarity of the particles of abrasive material and enhancing the bonding of the particles and the rubber formulation. It should also be noted that the heating of the particles of abrasive material acts essentially to burn off and remove the excess slag, thereby increasing the hardness of the particles. Thus, the primary purpose of heating the aluminum oxide or the aluminum oxide and magnetite is to provide substantially clean, moisture-free particles of abrasive material, a step found to be essential to assure an effective operative bonding between the rubber formulation and the particles of abrasive material. It should also be noted that, in some instances where the particles of abrasive material are not mixed with the rubber formulation within a relatively short period of time after being heated and are exposed in such a manner as to again collect some moisture, it is necessary to beat the particles of abrasive material at a temperature level sufficient to remove the collected moisture prior to mixing the particles into the rubber formulation.

After the particles of abrasive material have been sized and heated, the substantially clean, substantially moisture-free particles are then mixed into the uncured rubber formulation.

The rubber formulation is thoroughly mixed in either an internal mixer or an open mill to provide the uncured rubber formulation. The relatively fine particles of abrasive material are then mixed into the uncured rubber formulation on an open mill.

Particulate abrasive material found to be particularly suitable for mixing in a rubber formulation to form the mixture of the present invention consists essentially of two different aggregates, in one preferred form, as generally mentioned before, the first aggregate consists essentially of particles having a mesh size in the range of approximately 14 to approximately 20 with each particle consisting essentially of approximately 55 percent to 60 percent aluminum oxide and approximately 40 percent to 45 percent magnetite. Such a product has, in the past, been used as a non-slip floor hardener for concrete floors and may be obtained under the trade name FRICTEX 176 from Sonneborn Building Products, Inc. of Des Plains, Ill. "Mesh", as used herein, refers to the number of holes per linear inch in sieves used, for example, in the screening of particulate material employed in concrete work.

The second particulate material consists essentially of an aluminum oxide abrasive aggregate having a mesh size in the range of approximately 4 to 16. This latter product has been used in the past as a non-slip abrasive aggregate for concrete floors and may be obtained under the trade name of FRICTEX from Sonneborn Building Products, Inc. of Des Plains, Ill.

The ratio, by weight, of the abrasive particles to the uncured rubber formulation may vary over a wide range, such as 1:2 to 1:10, but is preferably about 1:5 on a weight basis.

The ratio of the aluminum oxide abrasive aggregate to the combination aluminum oxide and magnetite abrasive material referred to above may also vary over an appreciable range, but is preferably between 1:½ and 1:2. In any event, the abrasive particles are thoroughly mixed and distributed throughout the uncured rubber formulation.

A primary use of the present composition is in recapping existing tire carcasses. In such use, the mixture of the uncured rubber formulation and the abrasive particles is extruded through the desired die size into what may be considered a sheet of material having a width and thickness suitable for recapping a desired size of tire. In the recapping operation, the sheet of the mixture is placed around the existing tire carcass in the same manner that sheets of recapping rubber are placed around existing tire carcasses. The carcass, with the sheet thereon, is then placed in a mold which will provide the desired tread design, and the mold is heated to a curing temperature for the rubber formulation being employed, as in a normal recapping operation. When using a rubber formulation as specifically set forth above, the carcass with the sheet thereon is retained in a mold for approximately 1 hour at a temperature of about 300° Fahrenheit whereupon the rubber is cured and tightly bonded to the rubber in the existing tire carcass. It should be noted that the particles of abrasive material are heated in a manner described before, prior to mixing the particles and the uncured rubber formulation. In one form, the tire tread composition of the present invention is formed in a flat mold at relatively high temperature and pressure levels, and the precured tire tread composition is subsequently bonded to the tire carcass at a lower temperature level of approximately 200° Fahrenheit.

Tires recapped with the present tire tread composition have shown a remarkable ability to reduce slipping and skidding on wet paving, as well as extensively increase the ability for stopping. As the tire is worn, the abrasive particles become exposed to the road surface and tend to dig into the road surface when the tire starts to slip. Further, the tires appear to have a surface life as long as, if not greater than, a tire recapped with the same rubber formulation but without the abrasive particles embedded therein. From the foregoing it will be apparent that the present invention will materially increase the safety of driving motor vehicles. The tire of this invention has a reduced tendency to slip on both wet and dry paving and the tire may be economically manufactured. It will also be apparent that the method of the present invention provides an economical, efficient method for manufacturing tire treads wherein particles of an abrasive material are incorporated in the rubber formulation, substantially assuring a sufficient bond between the particles and the rubber formulation.

Changes may be made in the precise composition and method of manufacture heretofor set forth without departing from the spirit of the invention.

What is claimed is:

1. A method for manufacturing tires utilizing an uncured rubber formulation suitable for forming tire treads, the method comprising the steps of:
sizing particles of abrasive material consisting essentially of aluminum oxide abrasive aggregate to obtain particles of abrasive material having a predetermined maximum size;
heating the particles of abrasive material to at least 1800° Farenheit and for a period of time sufficient to remove the low temperature impurities, foreign matter and moisture to provide substantially clean, moisture-free particles of abrasive material; and mixing the particles of abrasive material into the uncured rubber formulation.

2. The method of claim 1 wherein the particles of abrasive material are heated to at least 1,800° Farenheit for at least 30 minutes.

3. The method of claim 1 wherein the particles of abrasive material are defined further to include an aggregate consisting essentially of magnetite, the particles being a mixture of aluminum oxide abrasive aggregate and magnetite aggregate each particle of which is approximately 55 percent to approximately 60 percent aluminum oxide and approximately 40 percent to approximately 45 percent magnetite.

4. The method of claim 1 wherein the particles of abrasive material are mixed into the uncured rubber formulation in predetermined amounts to obtain a ratio by weight of particles-to-rubber formulation in the range of approximately 1:2 to approximately 1:10.

5. The method of claim 1 wherein the particles of abrasive material are mixed into the uncured rubber formulation in predetermined amounts to obtain a ratio by weight of particles-to-rubber formulation in the range of approximately 1:5.

6. The method of claim 3 wherein the particles of abrasive material include substantially equal amounts by weight of aluminum oxide and magnetite.

7. The method of claim 1 wherein the predetermined maximum size of the abrasive material is defined as particles having a mesh size in the range of approximately 4 to approximately 16.

8. The method of claim 3 wherein the predetermined maximum size of the abrasive material is defined as aluminum oxide having a mesh size in the range of approximately 4 to approximately 16 and magnetite having a mesh size in the range of approximately 14 to approximately 20.

9. A method of recapping tires utilizing an uncured rubber formulation suitable for forming a tire tread wherein a tire tread is molded on a tire carcass, the method comprising the steps of:

sizing particles of abrasive material consisting essentially of aluminum oxide abrasive aggregate to obtain particles of abrasive material having a predetermined maximum size;

heating the particles of abrasive material to at least 1,800° Farenheit for a period of time sufficient to remove the low temperature impurities, foreign matter and moisture to provide substantially clean, moisture-free particles of abrasive material;

mixing the particles of abrasive material into the uncured rubber formulation suitable for forming tire treads;

extruding the mixture into a sheet;

placing the sheet around the tire carcass; and molding the sheet on the tire carcass into a tire tread at a temperature level sufficient to cure the rubber formulation.

10. A method of recapping tires utilizing an uncured rubber formulation suitable for forming a tire tread wherein a tire tread is bonded on a tire carcass, the method comprising the steps of:

sizing particles of abrasive material consisting essentially of aluminum oxide abrasive aggregate to obtain particles of abrasive material having a predetermined maximum size;

heating the particles of abrasive material to at least 1,800°F. for a period of time sufficient to remove the low temperature impurities, foreign matter and moisture to provide substantially clean, moisture-free particles of abrasive material;

mixing the particles of abrasive material into the uncured rubber formulation suitable for forming tire treads;

forming a tire tread composition utilizing the mixture;

placing the formed tread composition around the tire carcass; and bonding the tire tread composition to the tire carcass.

* * * * *